United States Patent [19]

Spangenberg

[11] Patent Number: 4,907,829
[45] Date of Patent: Mar. 13, 1990

[54] PIPE JOINT ASSEMBLY

[76] Inventor: Melvin Spangenberg, 4260 Freeman Ave., Hamilton, Ohio 45015

[21] Appl. No.: 141,292

[22] Filed: Jan. 5, 1988

[51] Int. Cl.[4] .............................................. F16L 35/00
[52] U.S. Cl. ...................................... 285/24; 285/405; 285/416
[58] Field of Search .................... 285/24, 27, 405, 158, 285/189, 134, 178, 138, 133.1, 412, 115, 333, 334, 390, 414, 222; 34/140, 134, 125, 124; 82/4 C

[56] References Cited

U.S. PATENT DOCUMENTS

| 338,670 | 3/1886 | Johnson | 285/189 X |
|---|---|---|---|
| 958,752 | 5/1910 | Mackensen | 285/178 X |
| 1,637,628 | 8/1927 | Weisgerber | 285/27 |
| 2,211,983 | 8/1940 | Parris | 285/414 X |
| 2,412,487 | 12/1946 | Amley | 285/405 X |
| 2,528,343 | 10/1950 | Davis | 285/405 X |
| 2,602,678 | 7/1952 | Mahoff | 285/408 |
| 2,628,851 | 2/1953 | Jessup | 285/27 X |
| 2,739,381 | 3/1956 | Petersen | 30/101 |
| 3,304,104 | 2/1967 | Wiltse | 285/27 X |
| 3,344,601 | 10/1967 | Mieczkowski | 285/405 X |
| 3,345,084 | 10/1967 | Hanes | 285/27 |
| 3,430,990 | 3/1969 | Nelson | 285/158 |
| 3,520,561 | 7/1970 | Rininger . | |
| 3,550,886 | 12/1970 | Cave | 285/158 X |
| 3,836,183 | 9/1974 | Battle | 285/414 X |
| 3,885,261 | 5/1975 | Skvarenina | 30/101 X |
| 3,943,638 | 3/1976 | Robson | 34/124 |
| 3,951,436 | 4/1976 | Hyde | 285/178 X |
| 3,993,330 | 11/1976 | Goransson | 285/158 X |
| 4,205,457 | 6/1980 | Sjostrand | 34/124 X |
| 4,402,136 | 9/1983 | Rast | 82/4 C X |
| 4,407,527 | 10/1983 | Reimert | 285/27 |
| 4,429,904 | 2/1984 | Reimert | 285/24 |
| 4,516,334 | 5/1985 | Wanke | 34/124 |
| 4,522,431 | 6/1985 | Reimert | 285/27 |
| 4,625,601 | 12/1986 | Brummet | 82/4 C |

FOREIGN PATENT DOCUMENTS

| 1554468 | 1/1969 | France | 285/219 |
|---|---|---|---|
| 0782288 | 9/1957 | United Kingdom | 285/405 |

Primary Examiner—Randolph A. Reese
Assistant Examiner—Carol I. Bordas
Attorney, Agent, or Firm—Evelyn M. Sommer

[57] ABSTRACT

A pipe joint assembly comprises a plate having a bore which is at least partially threaded to receive a pipe, and a guide sleeve leading to the pipe and having a larger inner diameter than the diameter of the bore. One or both ends of the guide sleeve can include an annular lip protruding inwardly to center the pipe with the bore. In another embodiment of the invention, the guide sleeve does not include either annular lip, and instead is mounted off center with the bore such that a portion of the inner surface of the sleeve is flush with a portion of a surface defining the bore to center the pipe with the bore.

13 Claims, 3 Drawing Sheets

PIPE JOINT ASSEMBLY

BACKGROUND OF THE INVENTION

The invention relates generally to pipe joint assemblies, and deals more particularly with a guide sleeve which facilitates alignment of a pipe to a mating bore in a pipe joint plate.

One application for the pipe joint assembly of the present invention is to join horizontal and curved condensate-removal syphon pipes located in the interior of a dryer roller of a paper making machine. After original installation of the horizontal pipe, it must occasionally be replaced. However, only a relatively small aperture may be provided in a wall of the dryer roller to provide access to the horizontal syphon pipe and pipe joint assembly. The small size of the aperture may limit access to a single arm and the head of a work person. Also, the horizontal pipe is typically several feet long and heavy. Consequently, it has proven difficult and time consuming to align an original or replacement horizontal syphon pipe with the mating bore in the pipe joint plate. Also, the dryer roller is maintained at a high temperature during use, and it is not desirable to wait for the dryer roller to cool before replacing the pipe. Therefore, excessive replacement time discomforts the work person.

Several ways were previously known to facilitate an initial alignment between two pipes prior to joining them. For example, U.S. Pat. No. 3,345,085 to Hanes discloses an extension tube integral with an end of a pipe, which extension tube has a flared bore to receive a tapered end of a mating pipe.

U.S. Pat. No. 4,429,904 to Reimert discloses an internally threaded member having a relatively large diameter, unthreaded entrance to facilitate alignment of an externally threaded member.

U.S. Pat. No. 4,407,527 to Reimert discloses an internally threaded tubular connector which is employed to threadably join two externally threaded members. This connector includes a portion having a relatively large inside diameter to permit the initial alignment of one of the externally threaded members prior to the actual threaded engagement in the connector. The connector also includes an inwardly facing annular guide surface at the mouth of the connector and a tapered surface adjacent to the internal threads.

U.S. Pat. No. 3,520,561 to Rininger discloses a connection for pipes used in oil drilling applications. In particular, an internally threaded member includes a central protruding tube portion which is guided into an adjacent pipe prior to the threaded engagement of the two pipe members. A similar structure is disclosed in U.S. Pat. No. 3,907,335 to Burge et al.

U.S. Pat. No. 1,637,628 to Weisgerber discloses a threaded connection employing generally frusto-conical threaded members to facilitate the initial alignment.

U.S. Pat. No. 3,304,104 to Wiltse discloses a tapered lead-in to facilitate the initial connection of non-threaded tubes.

All of the foregoing patents disclose joints which are complicated and apparently expensive to produce. In addition, none of the pipe joints described in the foregoing patents is adapted to facilitate initial alignment of a pipe to a threaded bore in a pipe joint plate, nor to such a plate mounted in a vertical plane such that the bore is horizontal.

Accordingly, a general object of the present invention is to provide apparatus which facilitates the alignment of a pipe to a mating bore in a pipe joint plate.

Another general object of the present invention is to provide apparatus of the foregoing type which is simple in construction and may be readily attached to existing pipe joint plates.

A more specific object of the present invention is to provide apparatus which is specially adapted to facilitate alignment of a pipe to a horizontal bore in a pipe joint plate.

SUMMARY OF THE INVENTION

The invention resides in a pipe joint assembly comprising a first plate having a bore at least partially threaded and adapted to receive an externally threaded pipe end. A cylindrical guide sleeve is mounted in fixed relation to the first plate leading to the bore. The sleeve has an inner diameter which is larger than the diameter of the bore to facilitate receipt of the pipe and alignment of the pipe with the bore in the first plate. A second plate is affixed to the first plate and also has a bore at least partially threaded and adapted to receive another externally threaded pipe end to communicate with the pipe in the first plate. The pipe joint assembly is suitable to join two syphon pipes within a dryer roller of a paper making machine.

In accordance with one feature of the invention, one or both ends of the guide sleeve have an annular lip protruding inwardly to center the associated pipe with the bore in the first plate. An annular lip at the mounted end of the guide sleeve slopes radially inwardly toward the mounted end such that s the pipe is inserted through the sleeve, the annular lip centers the pipe without catching the inserted end of the pipe.

An annular lip at the mouth of the guide sleeve is thin in the axial direction and tapered so that the guide sleeve can accommodate angular misalignment of the pipe.

The invention also resides in a method of producing the annular lip or lips in the guide sleeve. The guide sleeve is cut from pipe stock with a blade urged against the outer surface of the pipe stock while the pipe stock and blade undergo relative rotational movement. The force of the blade on the pipe stock forces pipe stock material at the end of the sleeve inwardly to form the lip.

According to another feature of the invention, the guide sleeve is mounted to the first plate off-center with the bore such that a portion of the inner surface of the guide sleeve is substantially flush with a portion of a surface defining the bore to facilitate alignment of the pipe with the bore. The diametrically opposed portion of the inner surface of the sleeve is spaced radially outwardly from the corresponding portion of the surface defining the bore.

DETAILED DESCRIPTION OF THE PREFERRED EMBODIMENTS

Figure 1:
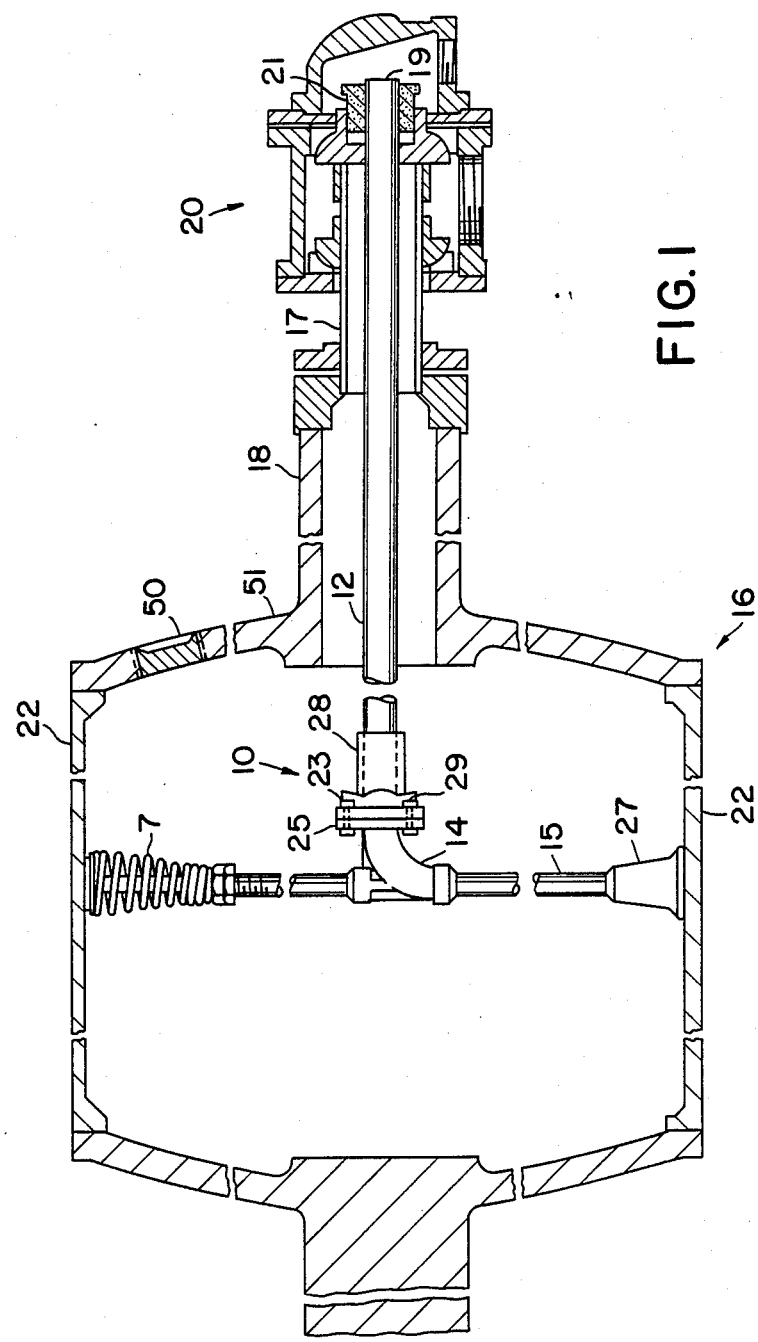
FIG. 1 is a longitudinal cross-sectional view of a dryer roller with syphon pipes and a pipe joint assembly constructed in accordance with the present invention.

Referring now to the drawings in detail, wherein like numerals indicate like elements throughout the several views, FIG. 1 illustrates a pipe joint assembly generally designated 10, made in accordance with the present invention. The pipe joint assembly 10 is illustrated as joining two syphon pipes 12 and 14 within a dryer roller 16 of a paper making machine. The syphon pipe 12 extends horizontally through a tubular journal 18 which is integrally connected at one end to the dryer roller 16 and rotatably supported at the other end on a bushing 17 of a rotary joint 20. A free end 19 of syphon pipe 12 extends through a seal 21 in the rotary joint. Consequently, the dryer roller 16, syphon pipes 12 and 14 and pipe joint assembly 10 may rotate relative to rotary joint 20.

The syphon pipe 14 is mated with another syphon pipe 15 which is held between the interior sidewall 22 of the dryer roller 16 in a vertical plane by a compressed spring encircling one end of pipe 15. The bell-shaped opposite end 27 of syphon pipe 15 remote from the spring is open and spaced slightly inwardly from cylindrical sidewall 22 of the dryer roller 16. In a typical application of the dryer roller 16, a paper web is entrained around the cylindrical sidewall 22 and heated by pressurized steam within the dryer roller 16 to implement a drying operation. Some of the steam condenses on the inside of the dryer roller and is forced into the bell end 27 by the pressure of the steam. Then the condensation proceeds through syphon pipe 15, syphon pipe 14, pipe joint assembly 10 and syphon pipe 12, and is finally discharged out the end 19.

The pipe joint assembly 10 includes a front plate 23 and a rear plate 25 affixed to each other by bolts 29 to form a seal. If desired, the seal may be improved by the imposition of a gasket (not shown) therebetween.

Figure 2:
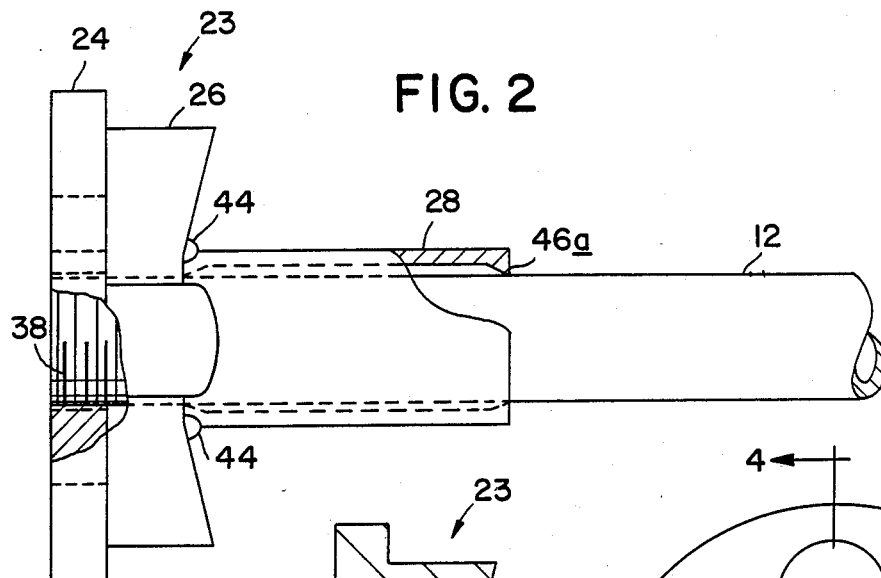
FIG. 2 is an enlarged, side view in elevation of one plate and a guide sleeve of the pipe joint assembly and the horizontal syphon pipe of FIG. 1, part of the sleeve being broken away to reveal a lip on the sleeve, and part of the plate being broken away to reveal a threaded end of the pipe.
Figure 4:
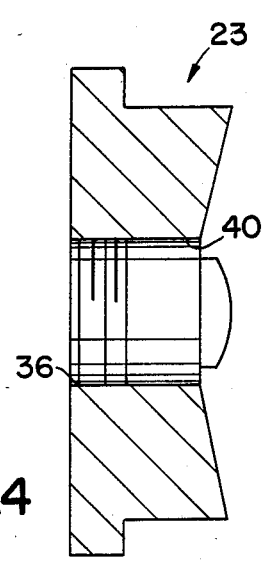
FIG. 4 is a cross-sectional view of the pipe joint plate of FIG. 3 along the plane indicated by line 4—4.
Figure 3:
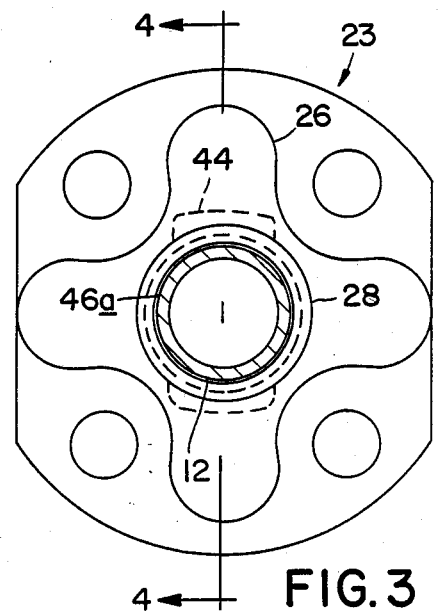
FIG. 3 is a front view in elevation of the pipe joint assembly of FIG. 2, with the syphon pipe being illustrated in cross-section.

As illustrated in FIGS. 2, 3 and 4, the front plate 23 comprises a base portion 24 and a raised portion 26. Base portion 24 includes a threaded bore 36 which is sized and adapted to threadably receive external threads 38 on an end of syphon pipe 12. The raised portion 26 includes a smooth (non-threaded) bore 40 concentric with the threaded bore 36 in the base portion. The diameter of the smooth bore 40 equals the diameter of the threaded bore 36 at the depth of the threads and is slightly larger than the outer diameter of the syphon pipe 12 to slidably receive the syphon pipe. By way of example, the diameter of the smooth bore 40 is 1¼". It should be noted that the front plate 23 and rear plate 25 as described above represent the prior art and have been used previously to join syphon pipes 12 and 14.

Focusing now on the present invention, a guide sleeve 28 is mounted by tack welds 44 to the front surface of raised portion 26 concentric with bores 40 and 36. The inner diameter of the sleeve 28 is larger, for example by ¼", than the diameter of smooth bore 40 in the front plate. Also, the inner surface of the guide sleeve 28 is smooth over nearly its entire length to slidably receive syphon pipe 12 en route to smooth bore 40 and threaded bore 36.

Figure 5:
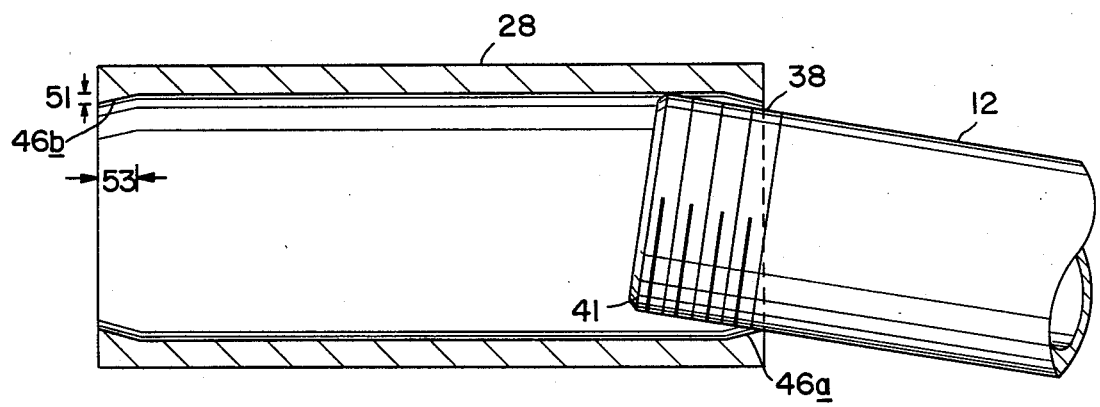
FIG. 5 is an enlarged, longitudinal cross-sectional view of the guide sleeve of FIG. 2 and an angularly misaligned syphon pipe partially received therein.

FIGS. 2, 3 and 5 illustrate, in enlargement, annular inner lips 46a and b at the front and rear ends of the guide sleeve. The lips 46a and b are formed by cutting the guide sleeve from black iron or steel pipe stock with a pipe cutter. The pipe cutter has a blade which is urged against the outer surface of the pipe stock while the pipe stock and blade undergo relative rotational movement. During such cutting, the blade exerts a force, for example 20–40 lbs., radially inwardly on the pipe stock, and near the completion of the cut, some of the pipe stock material in the vicinity of the cut is forced inwardly but remains attached at one end to the guide sleeve forming each annular lip 46a,b on the sleeve (and also a similar annular lip on the unused pipe stock end). By way of example, a radial width 51 of each lip 46a,b is approximately 1/32-⅛" so that the lips 46a and b center the syphon pipe 12 with the bore 40. Also, by way of example, an axial depth 53 of the lip is 1/32"-⅛". If excessive force is used in the pipe cutting operation, relatively large burrs may result at the ends of the sleeve, and may be removed by filing. If desired, after the guide sleeve 28 is cut from the pipe stock, either lip 46a,b may be removed by a machining operation.

To install the syphon pipe 12 into the pipe joint assembly 10, the syphon pipe is initially inserted through the bushing 17 and tubular journal 18, from right to left according to the orientation of FIG. 1. Next, the operator may remove a manhole cover 50 from a sidewall of the dryer roller 16 and extend his or her arm and head through the manhole and grasp the free end of the syphon pipe 12. It should be noted that in some applications, the distance from the sidewall 51 to the pipe joint assembly 10 is several feet, the pipe 12 is heavy, and the work person has limited access within the dryer roller. Consequently, alignment of the syphon pipe 12 with the bore 40 in pipe joint assembly 10 has proven difficult and time consuming in the past without the aid of the guide sleeve 28.

While the annular lip 46a reduces the size of the mouth of the guide sleeve, the guide sleeve can receive the syphon pipe despite angular misalignment as illustrated in FIG. 5. This is because the lip 46a has the relatively small axial depth described above, the lip 46a tapers radially toward the inner surface of the sleeve from the mouth of the sleeve, and the inner diameter of the adjacent portion of the guide sleeve is relatively large. Once the end of the syphon pipe 12 is inserted into the guide sleeve, the operator can readily insert the syphon pipe the length of the guide sleeve. At the mounted end of the guide sleeve, the syphon pipe engages the lip 46b. The lip is sloped radially inwardly of the sleeve toward the mounted end to gradually center the syphon pipe with the smooth bore 40 and prevent the end of the syphon pipe from abutting against the mouth of the bore 40. Then the guide sleeve can be further inserted into the smooth bore 40 and to the outermost thread of the threaded bore 36. Then, the operator can rotate the syphon pipe to threadably engage the syphon pipe in the threaded bore. A tapered bevel 41 at the threaded end of the syphon pipe also facilitates entry of the pipe into the smooth and threaded bores in the front plate.

Figure 6:
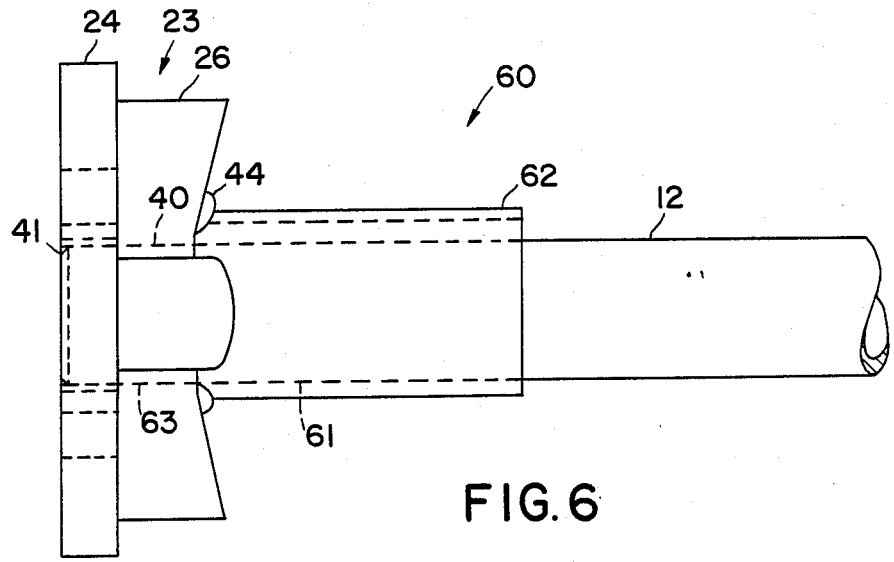
FIG. 6 is a side view in elevation similar to FIG. 2, but illustrating another embodiment of a plate and a guide sleeve of a pipe joint assembly embodying the present invention, and also illustrating a horizontal syphon pipe within the pipe joint assembly.
Figure 7:
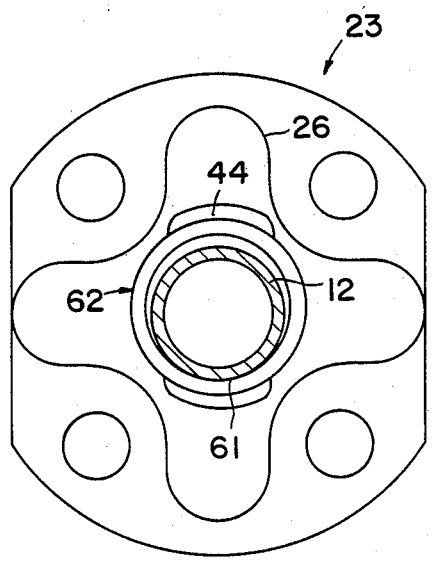
FIG. 7 is a front view in elevation of the pipe joint assembly of FIG. 6 with the syphon pipe being illustrated in cross-section.

FIGS. 6 and 7 illustrate a portion of another pipe joint assembly generally designated 60 formed in accordance with the present invention. The pipe joint assembly 60 is identical to the pipe joint assembly 10 with like reference numerals indicating like parts, except that the pipe joint assembly 60 includes a guide sleeve 62 instead of guide sleeve 28. Guide sleeve 62 is similar to guide sleeve 28 except that guide sleeve 62 does not include either annular lip 46a,b. Instead, the entire length of the guide sleeve 62 has a uniform inner diameter and is smooth. Also, guide sleeve 62 is mounted to the raised portion 26 off-center from the smooth bore 40. As illustrated in FIG. 6, a bottom inner surface 61 of the guide sleeve is coincident and flush with a surface 63 in the front plate defining a bottom of bore 40 to facilitate alignment of the syphon pipe with the bore 40.

The relatively large inner diameter of the guide sleeve facilitates initial insertion of the syphon pipe into the guide sleeve. Then, the syphon pipe can be further inserted the length of the guide sleeve, and the end of the guide sleeve maintained against the bottom surface of the guide sleeve either by positive force or by gravity to align the syphon pipe with the bore 40. Then, the syphon pipe can be further inserted into bore 40 and to the threaded bore, at which time the pipe can be turned therein. Without the off-center mount of the guide sleeve described above, the end of the syphon pipe may abut against the mouth of smooth bore 40, although the beveled end 41 of the syphon pipe partially alleviates this problem. It should be noted that in some applications, such as where the opposite end of the pipe initially rests below the level of bores 40 and 36, it may be desirable to insert the syphon pipe while the pipe joint assembly 60 is oriented 180° from the position illustrated in FIG. 6 such that the flush surfaces of the syphon pipe and smooth bore surface are at the top. In such a case, the threaded end of the pipe naturally slides along the upper surface of the sleeve to the flush surface of bore 40.

It should be appreciated that both of the guide sleeves 28 and 62 are relatively simple and inexpensive compared to the pipe joints in the patents described above. Also, in contrast to the prior art pipe joints, the guide sleeves 62 and 28 are easily mounted to an existing pipe joint assembly plate without modification of the plate itself. Moreover, the pipe joint assembly 60 is specially adapted to facilitate alignment of a pipe with a horizontal bore.

By the foregoing, pipe joint assemblies embodying the present invention have been disclosed. However, numerous modifications and substitutions may be made without deviating from the scope of the invention. For example, if desired, the raised portion 26 may be omitted and the guide sleeves 28 and 62 welded directly to the base portion 24. Also, if desired, the smooth bore 40 within the raised portion 26 may be enlarged, and the guide sleeve 28 mounted within the enlarged bore of the raised portion 26 adjacent to the threaded bore 36. Therefore, the invention has been disclosed by way of illustration and not limitation, and reference should be made to the following claims to determine the scope of the invention.

I claim:

1. A pipe joint assembly comprising:
   a first plate having a bore defined by an inner surface having an inner diameter, said bore being at least partially threaded and adapted to received an externally threaded end of a first pipe, the inner surface in said first plate defining said bore being smooth adjacent to a mouth of said bore;
   means for aligning the threaded end of said first pipe with said bore, said means to align comprising:
   a cylindrical guide sleeve affixed to said plate and having an inner surface with a larger inner diameter than the inner diameter of said bore; and
   an inner surface of said guide sleeve in alignment with the inner surface of said bore for slidably receiving the threaded end of said pipe and for aligning and guiding the threaded end of said pipe and for aligning and guiding the threaded end of said pipe into said bore in said first plate.

2. A pipe joint assembly as set forth in claim 1 wherein the inner diameter of said guide sleeve is approximately concentric with the inner diameter of said bore in said first plate.

3. A pipe joint assembly as set forth in claim 2 wherein each end of said sleeve has an annular lip protruding inwardly to center the pipe with said bore in said first plate.

4. A pipe joint assembly as set forth in claim 2 wherein said sleeve has an annular lip protruding inwardly at the affixed end of said sleeve, said annular lip sloping from the inner surface of said sleeve radially inwardly of said sleeve toward said affixed end of said sleeve such that as said pipe is inserted through said sleeve said annular lip centers said pipe to prevent the inserted end of said pipe from abutting against the first plate.

5. A pipe joint assembly as set forth in claim 2 wherein said sleeve has an annular lip protruding inwardly at a mouth of said sleeve and adapted to center said pipe in said sleeve, said lip tapering toward the inner surface of said sleeve away from the mouth so that said sleeve accommodates angular misalignment of the pipe.

6. A pipe joint assembly as set forth in claim 2 wherein said sleeve has an annular lip protruding inwardly at a mouth of said sleeve and adapted to center said pipe in said sleeve, said lip having an axial depth so that said sleeve accommodates angular misalignment of the pipe.

7. A pipe joint assembly as set forth in claim 1 wherein said sleeve is tack-welded to said first plate.

8. A pipe joint assembly as set forth in claim 1 wherein the inner surface of said sleeve is smooth along approximately the entire length of the said sleeve.

9. A pipe joint assembly as set forth in claim 1 further comprising means for mounting said first plate to a second plate, said second plate having a bore disposed approximately concentric with and in communication with the bore in said first plate, the bore in said second plate being threaded and adapted to receive the threaded end of a second pipe.

10. A pipe joint assembly as set forth in claim 1 wherein said guide sleeve is affixed to said first plate whereby the inner surface of said sleeve is off-center with the inner surface of the bore such that a portion of the inner surface of said sleeve is substantially flush with a portion of the inner surface defining said bore to facilitate alignment of said pipe with said bore.

11. A pipe joint assembly as set forth in claim 10 wherein the inner surface of said sleeve has a uniform inner diameter over substantially the entire length of said sleeve.

12. A pipe joint assembly as set forth in claim 10 further comprising a second plate affixed to said first plate, said second plate having a bore defined by an inner surface approximately concentric with and in communication with the inner surface of the bore in said first plate, said bore in said second plate being threaded and adapted to receive the threaded end of a second pipe, whereby said first and second pipes communicate with each other.

13. In a paper making machine having a cylindrical dryer roller, a horizontal syphon pipe supported along an axis of said dryer roller at least partially within said dryer roller, a transverse syphon pipe within said dryer roller, a first pipe joint plate having a bore defined by an inner surface having an inner diameter, said bore being at least partially threaded and adapted to receive an externally threaded end of said horizontal pipe, and a second pipe joint plate mounted to said first pipe joint plate and adapted to receive an externally threaded end of said transverse pipe, said horizontal and transverse pipes being in communication with each other through said first and second pipe joint plates, said dryer roller and said horizontal and transverse syphon pipes being mounted for rotation about said axis, the improvement comprising:

a cylindrical guide sleeve having an inner surface with a larger inner diameter than the inner diameter of said bore, wherein the inner surface in said first plate defining said bore is smooth adjacent to a mouth of said bore, said cylindrical guide sleeve affixed to said first pipe joint plate whereby the inner surface of said guide sleeve is in alignment with the inner surface of said bore so that the threaded end of said horizontal pipe can be aligned with and guided into said bore in said first pipe joint plate by said guide sleeve.

* * * * *